United States Patent
Xiong et al.

(10) Patent No.: US 10,326,514 B2
(45) Date of Patent: Jun. 18, 2019

(54) REFERENCE SIGNALS FOR INITIAL ACQUISITION IN 5G SYSTEMS

(71) Applicant: Intel IP Corporation, Santa Clara, CA (US)

(72) Inventors: Gang Xiong, Beaverton, OR (US); Huaning Niu, Milpitas, CA (US); Yushu Zhang, Beijing (CN); Jong-Kae Fwu, Sunnyvale, CA (US); Yuan Zhu, Beijing (CN); Ralf Matthias Bendlin, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/759,070

(22) PCT Filed: Dec. 21, 2015

(86) PCT No.: PCT/US2015/067102
§ 371 (c)(1),
(2) Date: Mar. 9, 2018

(87) PCT Pub. No.: WO2017/044144
PCT Pub. Date: Mar. 16, 2017

(65) Prior Publication Data
US 2018/0309495 A1 Oct. 25, 2018

Related U.S. Application Data

(60) Provisional application No. 62/217,528, filed on Sep. 11, 2015.

(51) Int. Cl.
*H04B 7/06* (2006.01)
*H04J 11/00* (2006.01)
(Continued)

(52) U.S. Cl.
CPC .......... *H04B 7/0695* (2013.01); *H04B 7/088* (2013.01); *H04J 11/00* (2013.01); *H04J 11/0073* (2013.01);
(Continued)

(58) Field of Classification Search
CPC ............... H04L 5/0007; H04L 27/2662; H04J 2211/005; H04J 11/0076; H04J 11/0073;
(Continued)

(56) References Cited

U.S. PATENT DOCUMENTS

| 2010/0118839 A1 | 5/2010 | Malladi et al. |
| 2012/0134284 A1* | 5/2012 | Dahlman ............ H04W 16/28 370/252 |

(Continued)

FOREIGN PATENT DOCUMENTS

| TW | 201711428 A | 3/2017 |
| WO | WO-2015109153 A1 | 7/2015 |
| WO | WO-2017044144 A1 | 3/2017 |

OTHER PUBLICATIONS

"International Application Serial No. PCT/US2015/067102, International Search Report dated Oct. 6, 2016", 3 pgs.

(Continued)

*Primary Examiner* — Jean B Corrielus
(74) *Attorney, Agent, or Firm* — Schwegman Lundberg & Woessner, P.A.

(57) ABSTRACT

Disclosed herein are apparatuses, systems, and methods for reference signal design for initial acquisition, by receiving a first primary synchronization signal (PSS) and a first secondary synchronization signal (SSS) from a first transmit (Tx) beam, in first contiguous orthogonal frequency division multiplexing (OFDM) symbols of a downlink subframe. A UE can receive at least a second PSS and a second SSS from a second Tx beam in contiguous OFDM symbols of the (Continued)

downlink subframe. A UE can then detect beamforming reference signals (BRSs) corresponding to the first Tx beam and the second Tx beam, based on identification of physical cell ID information and timing information processed from the first PSS, the second PSS, the first SSS, and the second SSS. The UE can select the first Tx beam or the second Tx beam that was received with the highest power, based on the BRSs. Other embodiments are described.

23 Claims, 8 Drawing Sheets

(51) Int. Cl.
H04L 5/00 (2006.01)
H04B 7/08 (2006.01)
H04L 27/26 (2006.01)
H04W 72/04 (2009.01)
H04W 84/04 (2009.01)

(52) U.S. Cl.
CPC ....... *H04J 11/0076* (2013.01); *H04J 11/0079* (2013.01); *H04L 5/00* (2013.01); *H04L 5/0007* (2013.01); *H04L 27/2662* (2013.01); *H04J 2211/005* (2013.01); *H04W 72/042* (2013.01); *H04W 72/0446* (2013.01); *H04W 84/045* (2013.01)

(58) Field of Classification Search
CPC ... H04B 7/088; H04B 7/0695; H04W 72/042; H04W 84/045; H04W 72/0446
See application file for complete search history.

(56) References Cited

U.S. PATENT DOCUMENTS

| | | |
|---|---|---|
| 2013/0196674 A1 | 8/2013 | Ahmadi |
| 2015/0131750 A1* | 5/2015 | Xue .................... H04B 7/0482 375/267 |
| 2017/0149480 A1* | 5/2017 | Kakishima ............... H04J 11/00 |
| 2017/0195998 A1* | 7/2017 | Zhang .................. H04B 7/086 |
| 2018/0235013 A1* | 8/2018 | Jung ................ H04W 74/0833 |

OTHER PUBLICATIONS

"International Application Serial No. PCT/US2015/067102, Written Opinion dated Oct. 6, 2016", 4 pgs.
Huawei, et al., "Discussion on UE behaviour after measurement gap for R12", R4-135100, 3GPP TSG-RAN WG4 Meeting #68bis, Riga, Latvia, [Online] retrieved from the internet:http://www.3gpp.org/ftp/tsg_ran/WG4_Radio/TSGR4_68Bis/docs, (Sep. 30, 2013) 7 pgs.
Nicolas, Barati C, et al., "Directional Cell Search for Millimeter Wave Cellular Systems", [Online] retrieved from the internet:http://arxiv.org/abs/1404.5068v1><Bibliographic Code: 2014arXiv1404.5068B>, (Apr. 2014) 5 pgs.

* cited by examiner

US 10,326,514 B2

REFERENCE SIGNALS FOR INITIAL ACQUISITION IN 5G SYSTEMS

CLAIM OF PRIORITY

This patent application is a U.S. National Stage Filing Under 35 U.S.C. 371 from International Application No. PCT/US2015/067102, filed Dec. 21, 2015, published as WO 2017/044144 A1, on Mar. 16, 2017, which claims the benefit of U.S. Provisional Patent Application No. 62/217,528, filed Sep. 11, 2015, entitled "REFERENCE SIGNAL DESIGN FOR INITIAL ACQUISITION", each of which are incorporated by reference herein in their entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of embodiments is not limited in this respect. Some embodiments pertain to 5G communications. Some embodiments relate to synchronization and beam acquisition.

BACKGROUND

As more and more people become users of mobile communication systems, there is an increasing need to utilize new frequency bands. Therefore, cellular communications has expanded into mid-band (carrier frequencies between 6 GHz and 30 GHz) and high-band (carrier frequencies greater than 30 GHz) spectra. Beamforming is needed to compensate large path loss associated with these frequency ranges. There is an increasing need to provide more effective beamforming and acquisition techniques in the mid-band and high-band spectra.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
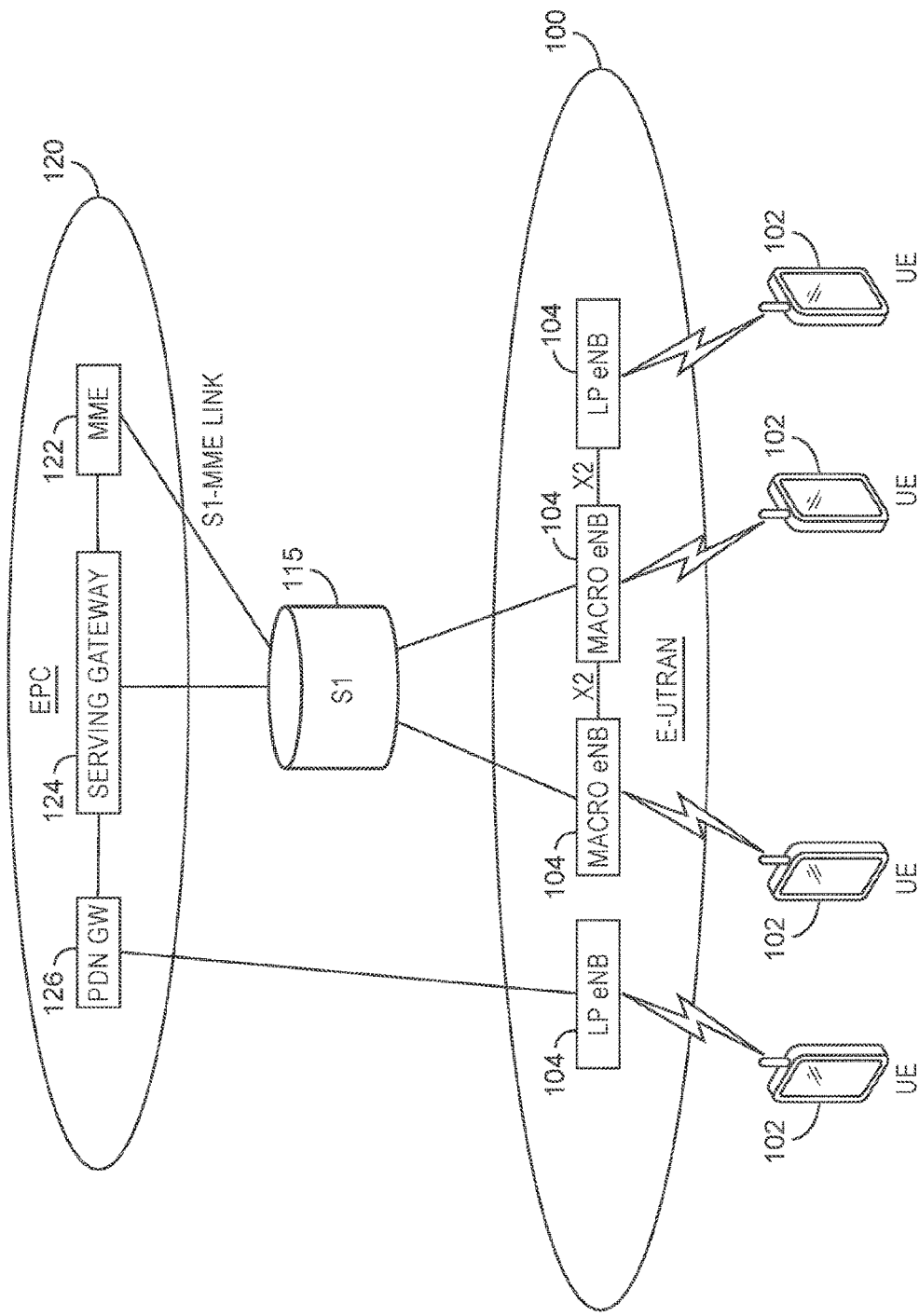
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which can operate as base stations) for communicating with User Equipment (UE) 102. The eNBs 104 can include macro eNBs and low power (LP) eNBs. In accordance with some embodiments, the eNB 104 can receive uplink data packets from the UE 102 on a Radio Resource Control (RRC) connection between the eNB 104 and the UE 102. The eNB 104 can transmit an RRC connection release message to the UE 102 to indicate a transition of the UE 102 to an RRC idle mode for the RRC connection. The eNB 104 can further receive additional uplink data packets according to the stored context information.

The MME 122 manages mobility aspects in access such as gateway selection and tracking area list management. The serving GW 124 terminates the interface toward the RAN 10, and routes data packets between the RAN 100 and the core network 120. In addition, it can be a local mobility anchor point for inter-eNB handovers and also can provide an anchor for inter-3GPP mobility Other responsibilities may include lawful intercept, charging, and some policy enforcement. The serving GW 124 and the MME 122 can be implemented in one physical node or separate physical nodes. The PDN GW 126 terminates an SGi interface toward the packet data network (PDN). The PDN GW 126 routes data packets between the EPC 120 and the external PDN, and can be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 can be implemented in one physical node or separated physical nodes. Furthermore, the MME 122 and the Serving GW 124 can be collapsed into one physical node in which case the messages will need to be transferred with one less hop.

The eNBs 104 (macro and micro) terminate the air interface protocol and can be the first point of contact for a UE 102. In some embodiments, an eNB 104 can fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 can be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals can comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus. LP eNB can be implemented with a picocell eNB since it is coupled to a macro eNB via an X2 interface. Picocell eNBs or other LP eNBs can incorporate some or all functionality of a macro eNB. In some cases, this can be referred to as an access point base station or enterprise femtocell.

The eNB 103 and UE 102 can be configured to operate in a variety of frequency bands. Recently, mmWave bands have come into greater use. MmWaves are radio waves with wavelength in the range of 1 millimeter (mm)-10 mm, which corresponds to a radio frequency of 30 Gigahertz (GHz)-300 GHz. MmWaves exhibit unique propagation characteristics. For example, compared with lower frequency radio waves, mmWaves suffer higher propagation loss, and have a poorer ability to penetrate objects, such as buildings, walls, etc. On the other hand, due to the smaller wavelengths of the mmWaves, more antennas may be packed in a relatively small area, thereby allowing for the implementation of a high-gain antenna in small form factor.

Beamforming enables high data rate transmission over mmWave links. In order to take advantage of beamforming. UEs 102 will perform timing and frequency synchronization and beam acquisition to access the network. Some algorithms for beam acquisition place additional burdens of complexity on a UE 102, or provide degraded performance in some circumstances.

Embodiments address these and other concerns by providing a resource mapping scheme for the transmission of primary synchronization signals (PSS), secondary synchronization signal (SSS), and beamforming reference signals (BRS). Embodiments allow a UE 102 to achieve symbol, subframe, and frame timing in one shot without performing additional baseband low pass filtering, thereby reducing UE 102 complexity and power consumption. Further, embodiments allow coherent detection of the SSS signal, thereby resulting in enhanced detection performance. In addition, the code space for BRS transmission can be substantially reduced, which can help to enhance the detection probability.

Procedure for Initial Timing and Beam Acquisition

Figure 2:
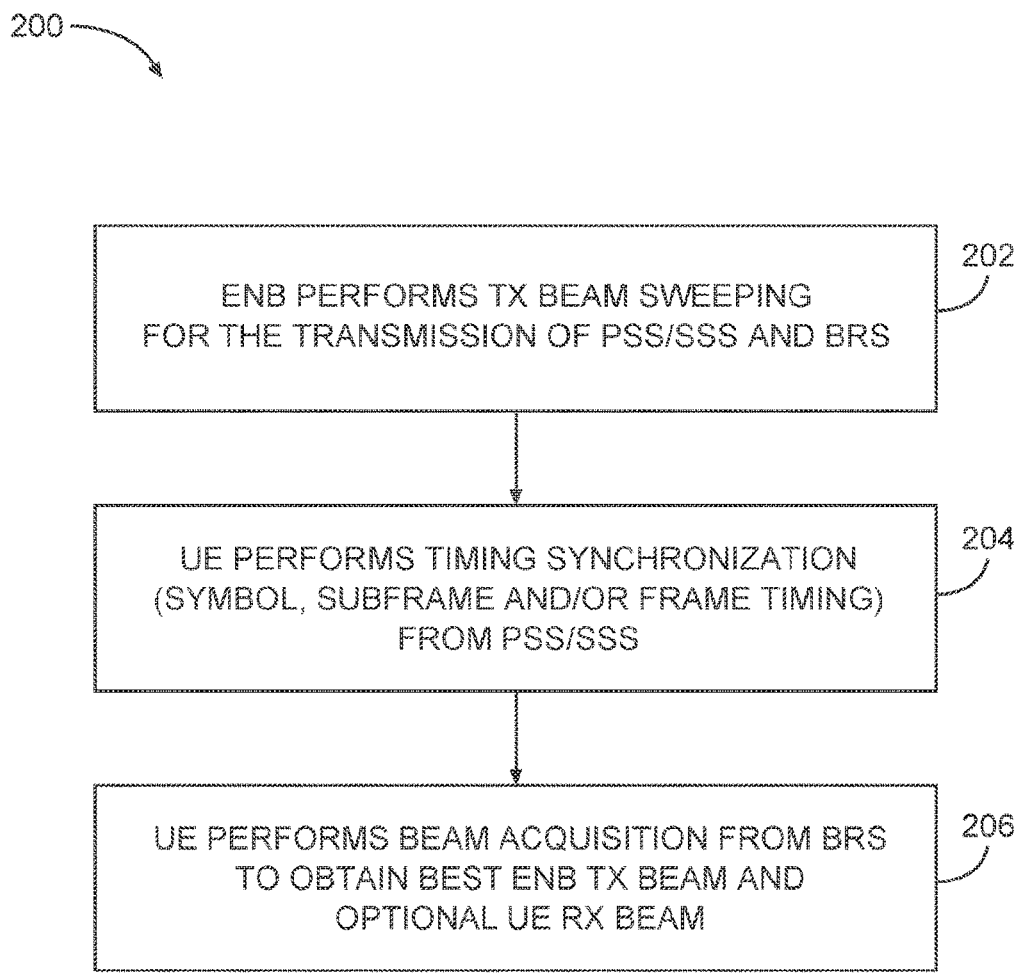
FIG. 2 illustrates a procedure for initial timing and beam acquisition in accordance with some embodiments.

FIG. 2 illustrates a procedure 200 for initial timing and beam acquisition in accordance with some embodiments. The procedure 200 begins with operation 202 with the eNB 104 performing Tx beam sweeping. For example, the eNB 104 can transmit, a first PSS, using a first transmit (Tx) beam, in a first OFDM symbol of a downlink subframe and a first SSS in a next subsequent OFDM symbol of the downlink subframe. Additionally, the eNB 104 can transmit, using a second Tx beam, at least a second PSS and a second SSS in second contiguous OFDM symbols of the downlink subframe. In embodiments, multiple eNBs 104 or TPs can use different beams to transmit PSS/SSS in the same symbols. In other words, the first Tx beam and second Tx beam may be a set of aggregated beams.

The example procedure 200 continues with operation 204 with the UE 102 receiving the above signals (e.g., the first PSS and first SSS in the first Tx beam in first contiguous OFDM symbols, and the second PSS and the second SSS in the second Tx beam in second contiguous OFDM symbols). The UE 102 can then perform timing synchronization at the symbol, subframe, and/or frame level, based on these signals.

The example procedure 200 continues with operation 206 with the UE 102 detecting beamforming reference signals (BRSs) corresponding to the first Tx beam and the second Tx beam, based on identification of physical cell ID information and timing information processed the above-described synchronization signals (e.g., PSS and SSS). The UE 102 can then select one of the Tx beams that was received with the highest power, based on the BRSs, to obtain the best eNB 104 Tx beam. Optionally, the UE 102 can perform receive antenna training to obtain the best UE 102 Rx beam, based on the detected BRSs.

Resource Mapping of PSS SSS and BRS Transmission

Figure 3:
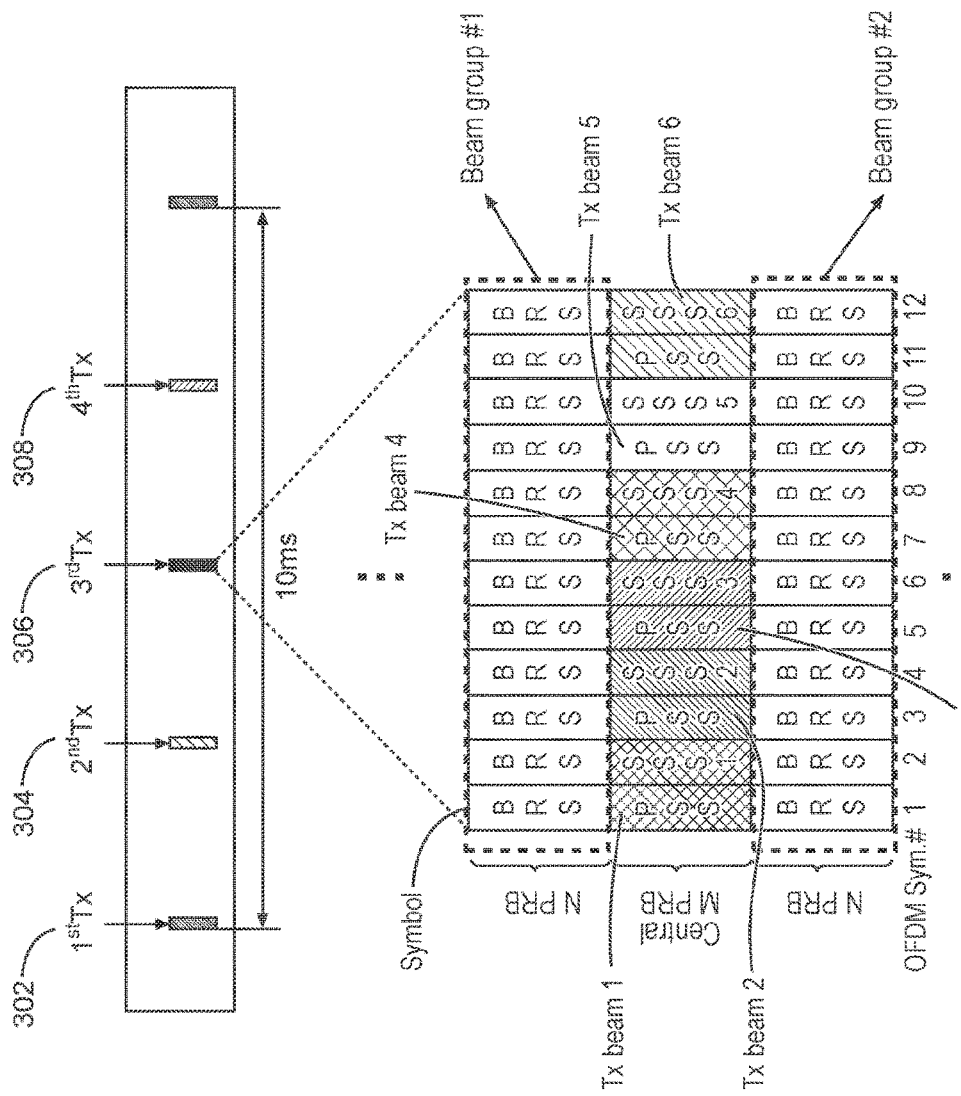
FIG. 3 illustrates an example of a resource mapping scheme for primary synchronization signals (PSS), secondary synchronization signals (SSS) and beamforming reference signals (BRS) in accordance with some embodiments.
Figure 4:
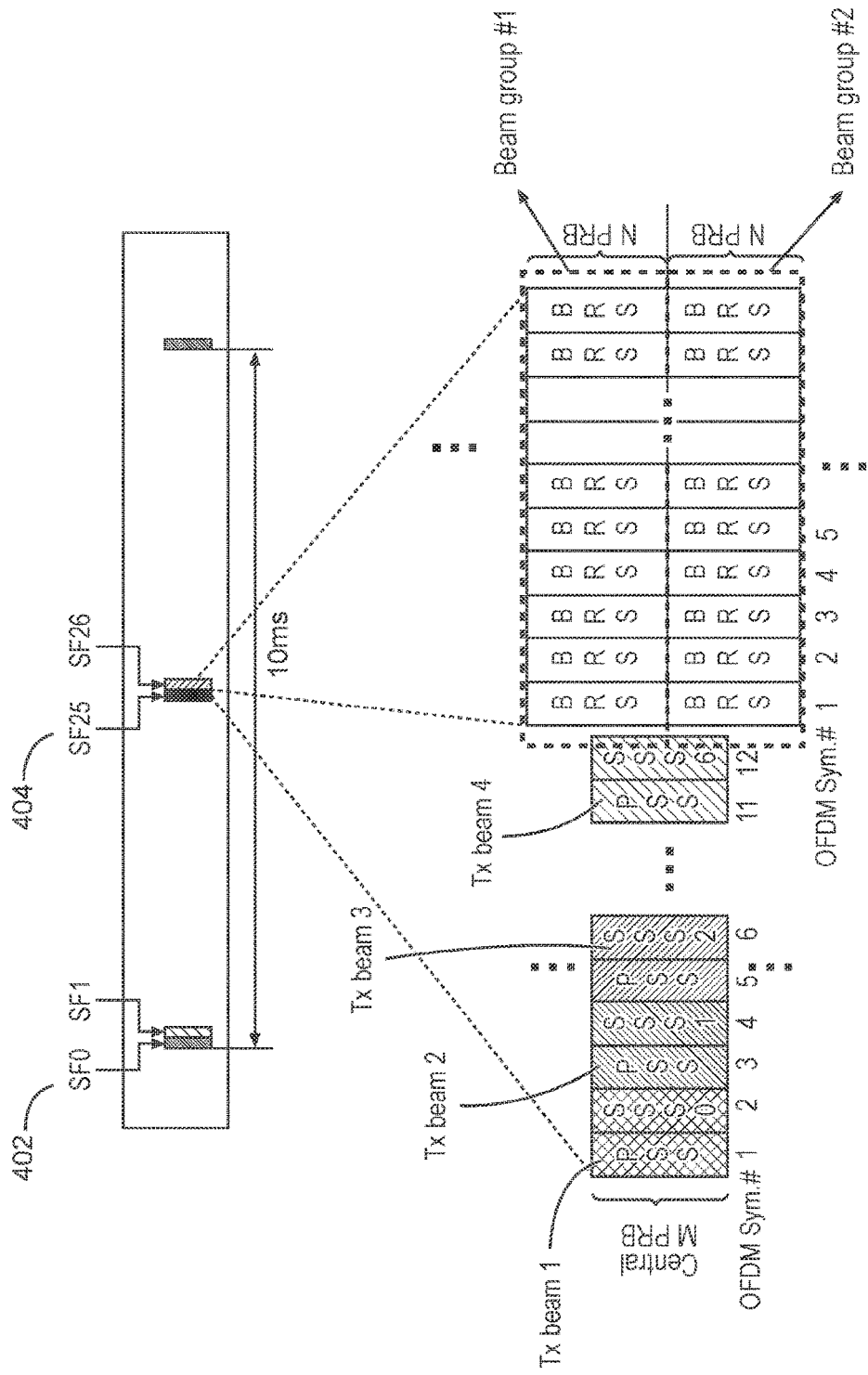
FIG. 4 illustrates another example of a resource mapping scheme for PSS, SSS and BRS in accordance with some embodiments.
Figure 5:
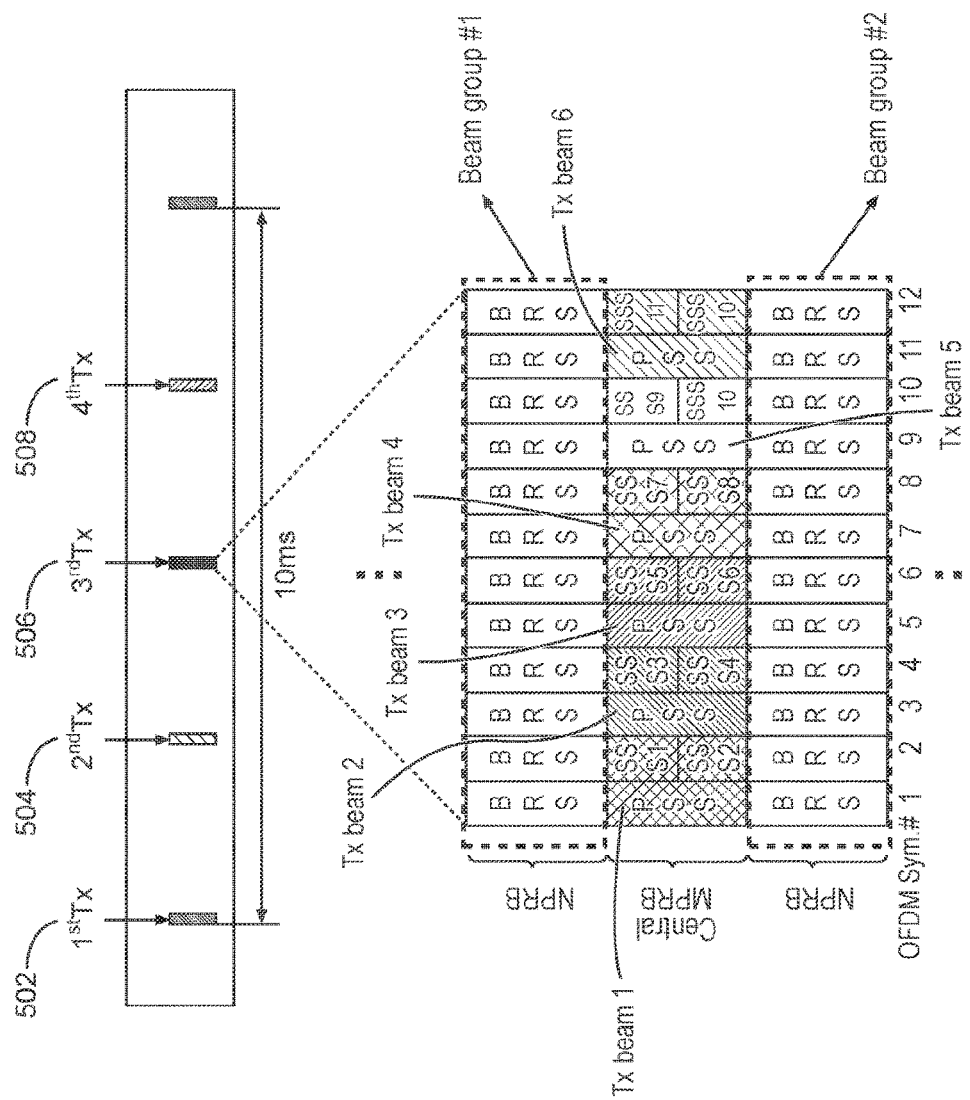
FIG. 5 illustrates yet another example of a resource mapping scheme for PSS, SSS and BRS in accordance with some embodiments.

FIGS. 3-5 illustrate example resource mapping schemes for PSS, SSS and BRS in accordance with some embodiments. While FIGS. 3-5 depict various example resource mappings, other resource mappings can be used General rules and concepts apply to the example FIGS. 3-5 and other example resource mappings of PSS/SSS/BRS transmission.

First, generally, the eNB 104 can transmit the PSS/SSS and BRS one or multiple times within one radio frame. The time and frequency locations of PSS/SSS and BRS transmission can be defined in 3GPP specification to enhance or enable UE 102 operation on cell search. To reduce the UE 102 complexity for timing synchronization, the eNB 104 can transmit Tx beamformed PSS/SSS in central physical resource blocks (PRBs). In addition, the same PSS sequence can be used within one subframe. Further, the eNB 104 can transmit the SSS in the OFDM symbol after or before PSS to provide the symbol, subframe and frame timing information. Note that same Tx beams are applied for the transmission of PSS/SSS within two consecutive symbols, to allow the UE 102 to perform coherent detection on the SSS sequence using the estimated channel from the PSS. To improve detection performance of PSS/SSS transmission, single frequency network (SFN) operation can be applied wherein multiple eNBs 104 or transmission points (TPs) can transmit the PSS/SSS on the same time or frequency resource simultaneously.

In general, each BRS can span one symbol and a number N of PRBs. In addition, PSS/SSS and BRS transmission can be either frequency-division multiplexed (FDM) or time-division multiplexed (TDM) In the FDM case, BRS is allocated around the PSS/SSS transmission in the same subframe. Depending on eNB 104 beamforming capability, multiple BRS resources can be used. In the TDM case, BRS is transmitted in a subframe before or after the subframe in which the PSS and SSS is transmitted. In one example, BRS is transmitted in the adjacent (e.g., next subsequent) subframe from which the PSS and SSS are transmitted Note that the timing relationship between PSS/SSS and BRS, (i.e., the L subframe gap between PSS/SSS and BRS) can be defined in 3GPP specifications to enhance or enable accurate beam acquisition by the UE 102.

One example mapping is shown in FIG. 3. In FIG. 3, PSS/SSS and BRS are transmitted four times 302, 304, 306 and 308 within one radio frame. For example, assuming 40 subframes are defined for one radio frame, then PSS/SSS and BRS can be transmitted in subframe #0, #10, 420 and #30. As shown in FIG. 3, six Tx beams (e.g., Tx beam 1, Tx beam 2, Tx beam 3, Tx beam 4, Tx beam 5, and Tx beam 6) can be applied for PSS/SSS. The same Tx beams can be applied on PSS/SSS in two consecutive OFDM symbols (e.g., Tx beam 1 can be applied in symbol 1 and symbol 2 to transmit PSS and SSS1).

Further, PSS/SSS and BRS can be FDM, as shown in FIG. 3. PSS/SSS can be transmitted in twelve OFDM symbols within one subframe and occupy the central M PRBs BRS can be transmitted in the PRBs adjacent to the PSS/SSS (e.g., in N PRBs shown in FIG. 3). In the example of FIG. 3, two BRS resources are shown, however, any other number of BRS resources can be provided to support a large number of beam IDs. Although not shown in FIG. 3, the Tx beam for each BRS transmission is different, which allows UE 102 to obtain the best eNB 104 Tx beam.

FIG. 4 illustrates another example of a resource mapping scheme for PSS, SSS and BRS in accordance with some embodiments. FIG. 4 PSS/SSS and BRS that are TDM, wherein BRS is transmitted after the PSS/SSS signals. For example, in a first transmission opportunity 402, PSS/SSS can be transmitted in subframe 0 while BRS is transmitted in subframe 1. In a second transmission opportunity 404, PSS/SSS can be transmitted in subframe 25 while BRS is transmitted in subframe 26. Similarly to the example shown in FIG. 3, six Tx beams (e.g., Tx beam 1, Tx beam 2, Tx beam 3, Tx beam 4. Tx beam 5, and Tx beam 6) can be applied for PSS/SSS. The same Tx beams can be applied on PSS/SSS in two consecutive OFDM symbols (e.g., Tx beam 1 can be applied in OFDM symbol 1 and OFDM symbol 2 to transmit PSS and SSS1) In the example illustrated in FIG. 4, BRS frequency resources are allocated around the D.C. subcarrier. A predefined gap can be defined between BRS and PSS/SSS An interleaved FDMA (IFDMA) signal structure can be adopted to generate repeated PSS signals in the time domain. This IFDMA structure with a RePetition Factor (RPF) of K would create K repeated blocks in the time domain. Based on this structure, the eNB 104 can apply the same Tx beam on this repeated PSS signal, which can help the UE 102 to achieve fast beamforming training.

The same number of PRBs may be allocated for the transmission of SSS as are allocated for the PSS. In one embodiment, a longer SSS sequence can be defined, which helps to create a large number of cell IDs or beam IDs. In another embodiment, multiple smaller SSS sequences may be multiplexed in the frequency domain.

FIG. 5 illustrates yet another example of a resource mapping scheme for PSS, SSS and BRS in accordance with some embodiments. In the example, the eNB 104 uses an IFDMA structure with K=2 for PSS transmission, such that the PSS occupies 2M PRBs in the frequency dimension. Two short SSS sequences are allocated adjacent to the PSS signal. As with FIG. 3, PSS/SSS and BRS are transmitted four times 502, 504, 506 and 508 within one radio frame. Six Tx beams (e.g., Tx beam 1, Tx beam 2. Tx beam 3, Tx beam 4, Tx beam 5, and Tx beam 6) can be applied for PSS/SSS. The same Tx beams can be applied on PSS/SSS in two consecutive OFDM symbols (e.g., Tx beam 1 can be applied in symbol 1 and symbol 2 to transmit PSS and SSS1) BRS can be FDM with PSS/SSS.

SSS and BRS Sequence Design

As described earlier herein, SSS is mainly used to achieve subframe and frame timing synchronization and provide cell ID information Given $P_0$ as the number of SSS transmissions within one subframe given $P_1$ as the number of SSS transmissions within one radio frame, in order to carry additional information, e.g., cell ID or beam ID, the code space of SSS will equal at least $P_0 \cdot P_1 \cdot P_2$, where $P_2$ indicates the number of bits for additional information.

Regarding the generation of SSS sequence, maximum length sequences (e.g., "M-sequences") can be adopted, which can be created by cycling through every possible state of a shift register of length n. The symbol index for the SSS transmission can be defined as a function of SSS sequence index:

$$I_{sym} = f(I_{SSS}) \qquad (1)$$

where $I_{sym}$ is the symbol index for SSS transmission, and $I_{SSS}$ is the SSS sequence index. In one example:

$$I_{sym} = \mathrm{mod}(I_{SSS}, N_{sym}) \qquad (2)$$

where $N_{sym}$ is the number of symbols used for SSS transmission within one subframe.

According to Equation (2), after successful detection of the SSS sequence, the UE 102 may derive the symbol index within one subframe. Alternatively, both the subframe index within a frame and the symbol index within one subframe can be indicated by the SSS sequence according to:

$$\begin{cases} I_{sym} = \mathrm{mod}(I_{SSS}, N_{sym}) \\ I_{sf} = \mathrm{mod}\left(\left\lfloor \dfrac{I_{SSS}}{N_{sym}} \right\rfloor, N_{sf}^{PSS}\right) \end{cases} \qquad (3)$$

where $N_{sf}^{PSS}$ indicates the number of PSS/SSS subframes within a frame and $I_{sf}$ is the subframe index.

Further, to provide the frame timing information, the eNB 104 can generate the SSS sequence according to at least one of a number of algorithms. In one embodiment, in when two SSS instances are transmitted in one radio frame, the eNB 104 can apply a swap operation to enable the UE 102 to detect the frame boundary. Alternatively, one SSS instance may be used and the subframe index may be obtained by the SSS sequence index.

In another embodiment, the eNB 104 can apply a Zadoff-Chu (ZC) sequence as the scrambling phase on the M sequence to generate the SSS signal. For example, the SSS sequence can be generated according to Equation (4):

$$S_l(n) = a(n) \cdot b_l(n) \quad (4)$$

where a(n) is the M-sequence with length of N, and $b_l(n)$ is the ZC sequence with $L_0$ scrambling phases and l=0, 1, ..., $L_0$−1.

In one example, the root index of lth ZC sequence can be defined as a function of l, which allows the UE 102 to detect the frame boundary based on the scrambling phase of ZC sequence.

As described earlier herein, the UE 102 uses the BRS for beam acquisition. After the UE 102 achieves time and frequency synchronization and obtains cell ID information, the UE 102 can detect the BRS to obtain the BRS ID The beam ID can be represented as a combination of the time or frequency resource used for the transmission of BRS and the BRS ID and/or cell ID. After the detection, the UE 102 reports the BRS ID with strongest Tx beam to the eNB 104 or group of eNBs.

Similar to the SSS sequence, the M-sequence can be adopted for determining or generating the BRS sequence. In one example, one of the existing M-sequences defined in specifications of the 3GPP family of specifications (e.g., 3GPP TS 36.211, section 6.11.2) can be reused for BRS sequence definition. Further, the pseudo-random sequence generator shall be initialized as a function of subframe index and physical cell ID, which is obtained from PSS and SSS.

Apparatuses for Performing Various Embodiments

Figure 6:
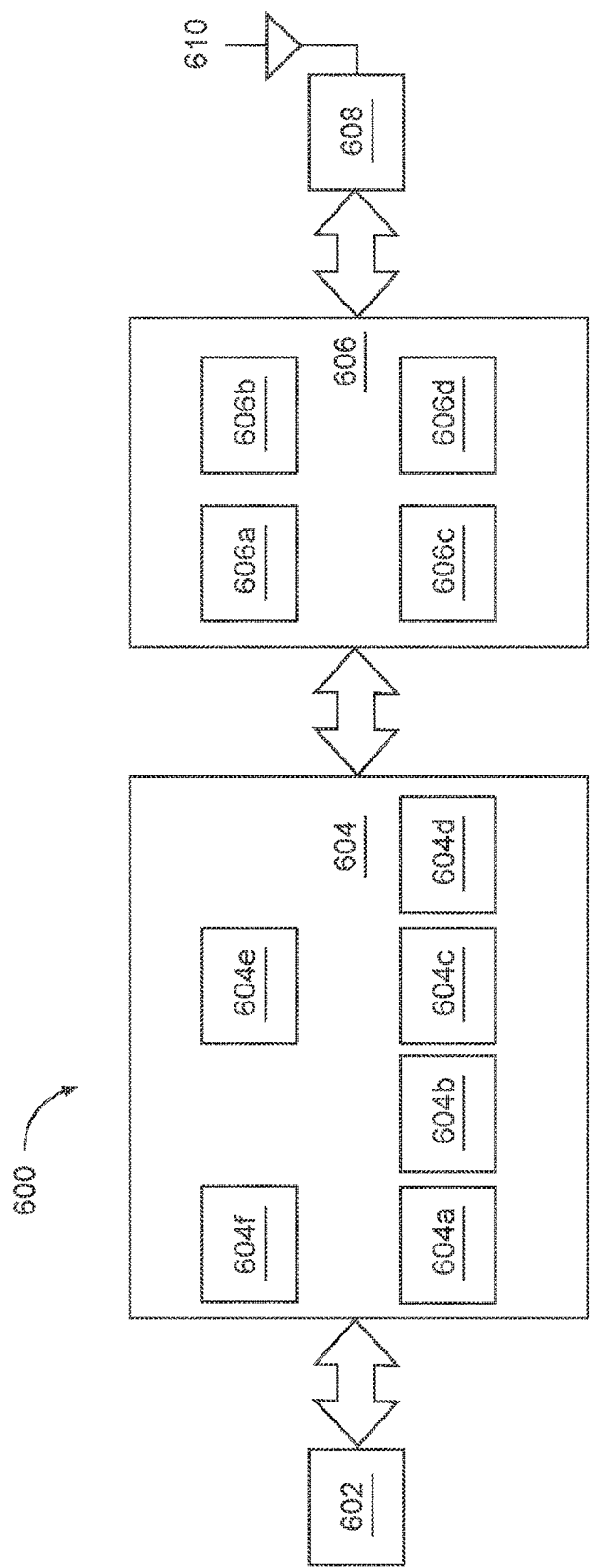
FIG. 6 is a functional diagram of a User Equipment (UE) in accordance with some embodiments.

FIG. 6 is a functional diagram of a User Equipment (UE) 600 in accordance with some embodiments. The UE 600 may be suitable for use as a UE 102 as depicted in FIG. 1. In some embodiments, the UE 600 may include application circuitry 602, baseband circuitry 604, Radio Frequency (RF) circuitry 606, front-end module (FEM) circuitry 608 and one or more antennas 610, coupled together at least as shown. In some embodiments, other circuitry or arrangements may include one or more elements and/or components of the application circuitry 602, the baseband circuitry 604, the RF circuitry 606 and/or the FEM circuitry 608, and may include other elements and/or components in some cases. As an example, "processing circuitry" may include one or more elements and/or components, some or all of which may be included in the application circuitry 602 and/or the baseband circuitry 604. As another example, "transceiver circuitry" may include one or more elements and/or components, some or all of which may be included in the RF circuitry 606 and/or the FEM circuitry 608. These examples are not limiting, however, as the processing circuitry and/or the transceiver circuitry may also include other elements and/or components in some cases.

In embodiments, the processing circuitry can configure the transceiver circuitry to receive a first PSS and a first SSS from a first Tx beam, in first contiguous OFDM symbols of a downlink subframe. The processing circuitry can configure the transceiver circuitry to receive at least a second PSS and a second SSS from a second Tx beam in contiguous OFDM symbols of the downlink subframe. For example, the resources for PSS/SSS can be configured as shown in any of FIGS. 3-5, although other resource mappings and configurations could be used.

The processing circuitry can configure the transceiver circuitry to detect BRSs corresponding to the first Tx beam and the second Tx beam (or to any of Tx beam 1, Tx beam 2, Tx beam 3, Tx beam 4, Tx beam 5, Tx beam 6 or other additional beams as shown by way of nonlimiting example in FIGS. 3-5), based on identification and timing information processed from the first PSS, the second PSS, the first SSS, and the second SSS. Using these detected BRSs, the UE 600 can select one of the beams (e.g., one of Tx beam 1, Tx beam 2, Tx beam 3, Tx beam 4, Tx beam 5 or Tx beam 6) that was received with the highest power, based on the BRSs. The UE 600 can report an identifier of the BRS that was received with the strongest Tx beam.

As shown in FIGS. 3-5, an or all of the above-described SSSs can be received in an OFDM symbol subsequent to the OFDM symbol in which a PSS was received. Further, an SSS and PSS can be received on the same PRB, and the SSS can be received in the same or different number of PRBs as the PSS. For example, as shown in FIG. 5, an SSS can be allocated half of the PRBs as a corresponding PSS and an additional SSS can be allocated in the same OFDM symbol as another SSS The SSS can be TDM with the PSS The hardware processing circuitry can configure the transceiver circuitry to perform channel estimation based on a PSS to perform coherence detection of an SSS. The Tx beams (e.g., Tx beam 1, Tx beam 2, Tx beam 3, Tx beam 4, Tx beam 5 or Tx beam 6) can be received from the same or different eNB 104.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to nm on the system.

The baseband circuitry 604 may include circuitry such as, but not limited to, one or more single-core or multi-core processors. The baseband circuitry 604 may perform operations including decoding a downlink control channel (e.g., PDCCH, ePDCCH, xPDCCH, etc). The baseband circuitry 604 may include one or more baseband processors and/or control logic to process baseband signals received from a receive signal path of the RF circuitry 606 and to generate baseband signals for a transmit signal path of the RF circuitry 606. Baseband circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC. PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect. In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606. In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer. In some embodiments, frequency input may be provided by a voltage-controlled oscillator (VCO), although that is not a requirement. Divider control input may be provided by either the baseband circuitry 604 or the application circuitry 602 depending on the desired output frequency In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610. In some embodiments, the UE 600 may include additional elements such as, for example, memory/storage, display, camera, sensor, and/or input/output (I/O) interface.

Figure 7:
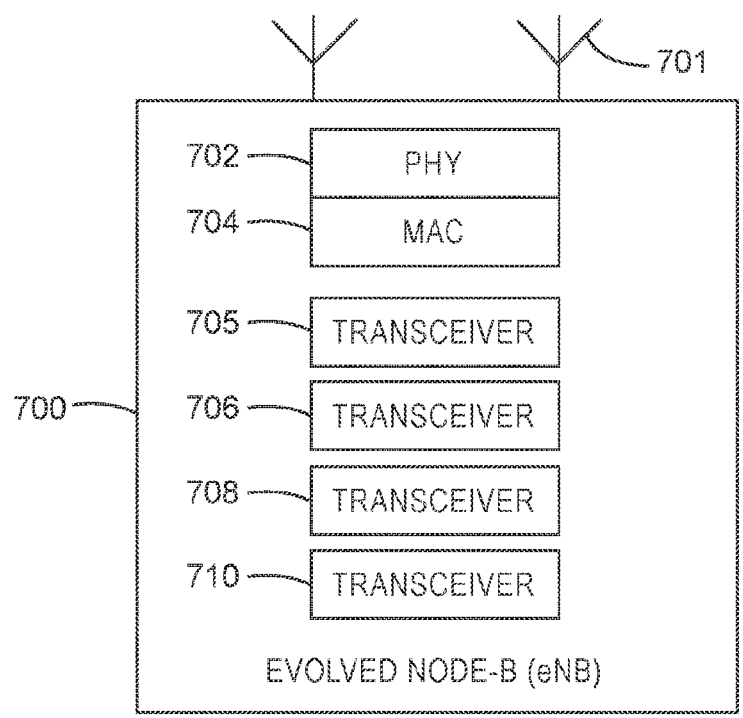
FIG. 7 is a functional diagram of an Evolved Node-B (eNB) in accordance with some embodiments.

FIG. 7 is a functional diagram of an Evolved Node-B (eNB) 700 in accordance with some embodiments. It should be noted that in some embodiments, the eNB 700 may be a stationary non-mobile device. The eNB 700 may be suitable for use as an eNB 104 as depicted in FIG. 1. The eNB 700 may include physical layer circuitry 702 and a transceiver 705, one or both of which may enable transmission and reception of signals to and from the UE 600, other eNBs, other UEs or other devices using one or more antennas 701. As an example, the physical layer circuitry 702 may perform various encoding and decoding functions that may include formation of baseband signals for transmission and decoding of received signals. As another example, the transceiver 705 may perform various transmission and reception functions such as conversion of signals between a baseband range and a Radio Frequency (RF) range. Accordingly, the physical layer circuitry 702 and the transceiver 705 may be separate components or may be part of a combined component. In addition, some of the functionality described may be performed by a combination that may include one, any or all of the physical layer circuitry 702, the transceiver 705, and other components or layers.

In some embodiments, the transceiver 705 can transmit, using a first Tx beam, a first PSS in a first OFDM symbol of a downlink subframe and a first SSS in a next subsequent OFDM symbol of the downlink subframe. As described earlier herein with reference to FIGS. 3-5, at least a second Tx beam (e.g., Tx beam 2) can be transmitted, including at least a second PSS and SSS in a second set of contiguous OFDM symbols. Any number of Tx beams with corresponding PSS/SSS can be transmitted. The eNB 700 can transmit BRSs using Tx beamforming sweeping, in an FDM or TDM manner with the PSS/SSS or set of PSS/SSS. The eNB 700 can receive signal reports based on the BRSs, from at least one UE 600 in a cell served by the eNB 700. The SSS and BRS sequences can be designed according to any of the algorithms described above with respect to Equations (1)-(3). For example, a symbol index for the SSS transmission can be defined as a function of the SSS sequence index according to Equation (1).

The eNB 700 may also include medium access control layer (MAC) circuitry 704 for controlling access to the wireless medium. The antennas 610, 701 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 610, 701 may be effectively separated to take advantage of spatial diversity and the different channel characteristics that may result. In FD MIMO embodiments, a two-dimensional planar antenna array structure may be used, and the antenna elements are placed in the vertical and horizontal direction as described earlier herein.

In some embodiments, the LE 600 or the eNB 700 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 600 or eNB 700 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 600, eNB 700 or other device may include one or more of a keyboard, a display, a non-volatile memory port, multiple antennas, a graphics processor, an application processor, speakers, and other mobile device elements. The display may be an LCD screen including a touch screen.

Figure 8:
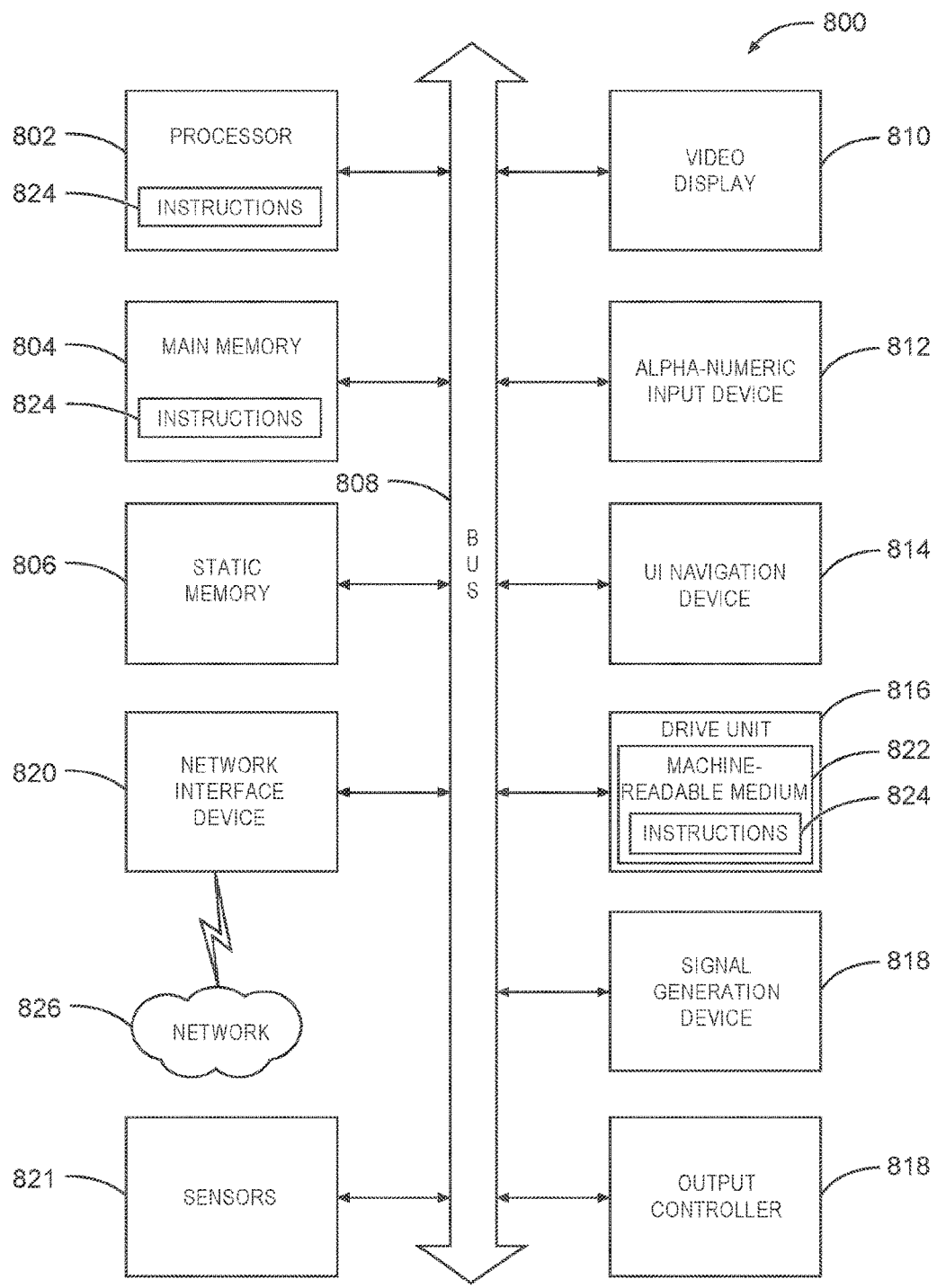
FIG. 8 is a block diagram illustrating components of a machine, according to some example embodiments, able to read instructions from a machine-readable medium and perform any one or more of the methodologies discussed herein, in accordance with some embodiments.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a UE, eNB, MME, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a computer-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse) In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a computer-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute computer-readable media.

While the computer-readable medium 822 is illustrated as a single medium, the term "computer-readable medium" may include a single medium or multiple media (e.g., a centralized or distributed database, and/or associated caches and servers) configured to store the one or more instructions 824. When the machine 800 operates as a UE, the computer-readable medium 822 can instruct one or more processors of the UE to receive a first PSS and a first SSS from a first Tx beam, in a same central PRB of a first set of two contiguous OFDM symbols of a downlink subframe; to receive at least a second PSS and a second SSS from a second Tx beam, in a second set of two contiguous OFDM symbols of the downlink subframe, in the same central PRB as the first PSS and the first SSS; to detect BRSs corresponding to the first Tx beam and the second Tx beam, based on identification and timing information received in the first PSS, the second PSS, the first SSS, and the second SSS, to select the one of the first Tx beam and the second Tx beam that was received with the highest power; and to report a beam identifier corresponding to a Tx beam that was received with highest power, the beam identifier comprised of a resource used for transmission of the BRS with the highest power, and a BRS identifier of the BRS received with the highest power.

The term "computer-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting computer-readable medium examples may include solid-state memories, and optical and magnetic media. Specific examples of computer-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks, magneto-optical disks; Random Access Memory (RAM); and CD-ROM and DVD-ROM disks. In some examples, computer-readable media may include non-transitory computer-readable media. In some examples, computer-readable media may include computer-readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), MIMO, FD-MIMO, or multiple-input single-output (MISO) techniques. In some examples, the network interface device 820 may wirelessly communicate using FD-MIMO techniques. The term "transmission medium" shall be taken to include any intangible medium that is capable of storing, encoding or carrying instructions for execution by the machine 800, and includes digital or analog communications signals or other intangible medium to facilitate communication of such software.

To better illustrate the apparatuses, systems, and methods disclosed herein, a non-limiting list of examples is provided herein:

In Example 1, an apparatus for a User Equipment (UE) comprises transceiver circuitry and hardware processing circuitry, the hardware processing circuitry to configure the transceiver circuitry to: receive a first primary synchronization signal (PSS) and a first secondary synchronization signal (SSS) from a first transmit (Tx) beam, in first contiguous orthogonal frequency division multiplexing (OFDM) symbols of a downlink subframe; receive at least a second PSS and a second SSS from a second Tx beam in contiguous OFDM symbols of the downlink subframe; and detect beamforming reference signals (BRSs) corresponding to the first Tx beam and the second Tx beam, based on identification of physical cell ID and timing information processed from the first PSS, the second PSS, the first SSS, and the second SSS, to select the one of the first Tx beam and the second Tx beam that was received with the highest power based on the BRSs.

In Example 2, the subject matter of Example 1 can optionally include wherein the first SSS is received in an OFDM symbol subsequent to the OIDM symbol in which the first PSS was received and wherein the first SSS and the first PSS are received on a same physical resource block (PRB) and time-division multiplexed (TDM) with the second PSS and the second SSS.

In Example 3, the subject matter of Example 1 can optionally include wherein a same number of physical resource blocks (PRBs) is allocated for the first SSS as is allocated for the first PSS.

In Example 4, the subject matter of any of Examples 1-3 can optionally include wherein the first SSS is allocated half of the physical resource blocks (PRBs) as is allocated for the first PSS, and wherein an additional SSS is allocated in the same OFDM symbol as the first SSS.

In Example 5, the subject matter of Example 4 can optionally include wherein the BRSs are frequency division multiplexed (FDM) in a same downlink subframe with the first PSS, the second PSS, the first SSS, and the second SSS.

In Example 6, the subject matter of any of Examples 1-5 can optionally include wherein the first PSS, the second PSS, the first SSS, and the second SSS occupy central physical resource blocks of a downlink subframe.

In Example 7, the subject matter of any of Examples 1-6 can optionally include wherein the BRSs are time-division multiplexed (TDM) with the first PSS, the second PSS, the first SSS, and the second SSS.

In Example 8, the subject matter of Example 7 can optionally include wherein the BRSs are received in a different subframe from the first PSS, the second PSS, the first SSS and the second SSS.

In Example 9, the subject matter of Example 8 can optionally include wherein a time gap is reserved and defined by specification between the BRSs and at least one of the first PSS, the second PSS, the first SSS and the second SSS.

In Example 10, the subject matter of any of Examples 1-9 can optionally include wherein the hardware processing circuitry configures the transceiver circuitry further to perform channel estimation based on the first PSS to perform coherence detection of the first SSS.

In Example 11, the subject matter of any of Examples 1-10 can optionally include wherein the first Tx beam and the second Tx beam are received from different Evolved Node-Bs (eNBs).

In Example 12, the subject matter of any of Examples 1-11 can optionally include wherein the hardware processing circuitry configures the transceiver circuitry further to report an identifier of the BRS that was received with the strongest Tx beam.

In Example 13, the subject matter of any of Examples 1-12 can optionally include wherein the BRSs, the first PSS, the second PSS, the first SSS, and the second SSS are each received at least twice in one radio frame.

In Example 14, the subject matter of any of Examples 1-13 can optionally include wherein a pseudo-random sequence generator for the generation of BRS is initialized as a function of subframe index and physical cell ID which is obtained from PSS and SSS.

In Example 15, the subject matter of any of Examples 1-14 can optionally include baseband circuitry to decode a downlink control channel.

In Example 16, a computer-readable medium stores instructions for execution by one or more processors to perform operations for communication by user equipment (UE), the operations to configure the one or more processors to: receive a first primary synchronization signal (PSS) and a first secondary synchronization signal (SSS) from a first transmit (Tx) beam, in a same central physical resource block (PRB) of a first set of two contiguous orthogonal frequency division multiplexing (OFDM) symbols of a downlink subframe; receive at least a second PSS and a second SSS from a second Tx beam, in a second set of two contiguous OFDM symbols of the downlink subframe, in the same central PRB as the first PSS and the first SSS; detect beamforming reference signals (BRSs) corresponding to the first Tx beam and the second Tx beam, based on identification of physical cell ID information and timing information received in the first PSS, the second PSS, the first SSS, and the second SSS, to select the one of the first Tx beam and the second Tx beam that was received with the highest power; and report a beam identifier corresponding to a Tx beam that was received with highest power, the beam identifier comprised of a resource used for transmission of the BRS with the highest power, and at least one of a BRS identifier of the BRS received with the highest power and physical cell ID information.

In Example 17, the subject matter of Example 16 can optionally include wherein the BRSs are frequency division multiplexed (FDM) in a same downlink subframe with the first PSS, the second PSS, the first SSS, and the second SSS.

In Example 18, the subject matter of any of Examples 16-17 can optionally include wherein the BRSs are time-division multiplexed (TDM) with the first PSS, the second PSS, the first SSS, and the second SSS.

In Example 19, the subject matter of any of Examples 16-18 can optionally include wherein the first Tx beam and the second Tx beam are received from different Evolved Node-Bs (eNBs).

In Example 20, the subject matter of any Examples 16-19 can optionally include wherein the BRSs, the first PSS, the second PSS, the first SSS, and the second SSS are each received at least twice in one radio frame, and wherein a subframe index in which the BRSs, the first PSS, the second PSS, the first SSS and the second SSS are received are defined as a function of SSS sequence index.

Example 21 includes an apparatus for an Evolved Node-B (eNB), the apparatus comprising hardware processing circuitry and transceiver circuitry, the hardware processing circuitry to configure the transceiver circuitry to: transmit, using a first transmit (Tx) beam, a first primary synchronization signal (PSS) in a first orthogonal frequency division multiplexing (OFDM) symbol of a downlink subframe and a first secondary synchronization signal (SSS) in a next subsequent OFDM symbol of the downlink subframe; transmit, using a second Tx beam, at least a second PSS and a second SSS in second contiguous OFDM symbols of the downlink subframe; and transmit beamforming reference signals (BRSs) using Tx beamforming sweeping, in an FDM or TDM manner with the first PSS based on physical cell ID and subframe index.

In Example 22, the subject matter of Example 21 can optionally include wherein the hardware processing circuitry is further to configure the transceiver circuitry to receive signal strength reports based on the BRSs from at least one user equipment (UE) in a cell served by the eNB.

In Example 23, the subject matter of any of Examples 21-22 can optionally include wherein an index for the downlink subframe is defined as a function of SSS sequence index.

In Example 24, the subject matter of any of Examples 21-23 can optionally include wherein an index for the first OFDM symbol is defined as a function of SSS sequence index.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

What is claimed is:

1. An apparatus for a User Equipment (UE), the apparatus comprising transceiver circuitry and hardware processing circuitry, the hardware processing circuitry to configure the transceiver circuitry to:
   receive a first primary synchronization signal (PSS) and a first secondary synchronization signal (SSS) from a first transmit (Tx) beam, in first contiguous orthogonal frequency division multiplexing (OFDM) symbols of a downlink subframe;
   receive at least a second PSS and a second SSS from a second Tx beam in second contiguous OFDM symbols of the downlink subframe; and
   detect beamforming reference signals (BRSs) corresponding to the first Tx beam and the second Tx beam, based on identification of physical cell identifier (ID) and timing information processed from the first PSS, the second PSS, the first SSS, and the second SSS, to select one of the first Tx beam and the second Tx beam that was received with the highest power based on the BRSs.

2. The apparatus of claim 1, wherein the first SSS is received in an OFDM symbol subsequent to an OFDM symbol in which the first PSS was received and wherein the first SSS and the first PSS are received on a same physical resource block (PRB) and time-division multiplexed (TDM) with the second PSS and the second SSS.

3. The apparatus of claim 2, wherein a same number of physical resource blocks (PRBs) is allocated for the first SSS as is allocated for the first PSS.

4. The apparatus of claim 2, wherein the first SSS is allocated half of the physical resource blocks (PRBs) as are allocated for the first PSS, and wherein an additional SSS is allocated in the same OFDM symbol as the first SSS.

5. The apparatus of claim 1, wherein the BRSs are frequency division multiplexed (FDM) in the downlink subframe with the first PSS, the second PSS, the first SSS, and the second SSS.

6. The apparatus of claim 5, wherein the first PSS, the second PSS, the first SSS, and the second SSS occupy central physical resource blocks the downlink subframe.

7. The apparatus of claim 1, wherein the BRSs are time-division multiplexed (TDM) with the first PSS, the second PSS, the first SSS, and the second SSS.

8. The apparatus of claim 7, wherein the BRSs are received in a different subframe from the first PSS, the second PSS, the first SSS and the second SSS.

9. The apparatus of claim 8, wherein a time gap is reserved and defined by specification between the BRSs and at least one of the first PSS, the second PSS, the first SSS and the second SSS.

10. The apparatus of claim 1, wherein the hardware processing circuitry is further configured to:
    perform channel estimation based on the first PSS to perform coherence detection of the first SSS.

11. The apparatus of claim 1, wherein the first Tx beam and the second Tx beam are received from different Evolved Node-Bs (eNBs).

12. The apparatus of claim 1, wherein the hardware processing circuitry configures the transceiver circuitry further to:
    report an identifier of a BRS of the BRSs that was received with the strongest Tx beam among the BRSs.

13. The apparatus of claim 1, wherein the BRSs, the first PSS, the second PSS, the first SSS, and the second SSS are each received at least twice in one radio frame.

14. The apparatus of claim 1, further comprising baseband circuitry to decode the first PSS, the second PSS, the first SSS, and the second SSS.

15. A non-transitory computer-readable storage medium that stores instructions for execution by one or more processors to perform operations for communication by a User Equipment (UE), the operations to configure the one or more processors to:
- receive a first primary synchronization signal (PSS) and a first secondary synchronization signal (SSS) from a first transmit (Tx) beam, in a same central physical resource block (PRB) of a first set of two contiguous orthogonal frequency division multiplexing (OFDM) symbols of a downlink subframe;
- receive at least a second PSS and a second SSS from a second Tx beam, in a second set of two contiguous OFDM symbols of the downlink subframe, in the same central PRB as the first PSS and the first SSS;
- detect beamforming reference signals (BRSs) corresponding to the first Tx beam and the second Tx beam, based on identification of physical cell identifier (ID) information and timing information received in the first PSS, the second PSS, the first SSS, and the second SSS, to select one of the first Tx beam and the second Tx beam that was received with the highest power; and
- report a beam identifier corresponding to the selected Tx beam, the beam identifier comprised of a resource used for transmission of a BRS with the highest power, and at least one of a BRS identifier of the BRS received with the highest power and the physical cell ID information.

16. The computer-readable storage medium of claim 15, wherein the BRSs are frequency division multiplexed (FDM) in the downlink subframe with the first PSS, the second PSS, the first SSS, and the second SSS.

17. The computer-readable storage medium of claim 15, wherein the BRSs are time-division multiplexed (TDM) with the first PSS, the second PSS, the first SSS, and the second SSS.

18. The computer-readable storage medium of claim 15, wherein the first Tx beam and the second Tx beam are received from different Evolved Node-Bs (eNBs).

19. The computer-readable storage medium of claim 15, wherein the BRSs, the first PSS, the second PSS, the first SSS, and the second SSS are each received at least twice in one radio frame, and wherein a subframe index in which the BRSs, the first PSS, the second PSS, the first SSS and the second SSS are received are defined as a function of SSS sequence index.

20. An apparatus for a User Equipment (UE), the apparatus comprising transceiver circuitry and hardware processing circuitry, the hardware processing circuitry to configure the transceiver circuitry to:
- receive, in central physical resource block (PRBs) of a downlink subframe, sets of primary synchronization signals (PSSs) and secondary synchronization signals (SSSs), the PSS and SSS in each set being different from the PSS and SSS in at least one other of the sets, each set received in a different transmit (Tx) beam from different evolved Node-Bs (eNBs); and
- detect beamforming reference signals (BRSs) corresponding to the Tx beams, based on identification of physical cell identifier (ID) and timing information processed from the sets, to select one of the Tx beams that was received with the highest power based on the BRGs.

21. The apparatus of claim 20, wherein the PSS and SSS in at least one of the sets are allocated a same number of the PRBs.

22. The apparatus of claim 20, wherein the PSS in at least one of the sets is allocated multiple PRBs, and at least one additional SSS is allocated in the same orthogonal frequency division multiplexing (OFDM) symbol as the SSS in the at least one of the sets such that the PSS occupies a same number of PRBs as the SSS and the at least one additional SSS in the at least one of the sets.

23. The apparatus of claim 20, wherein at least one of:
- each set is received multiple times in one radio frame, or
- the hardware processing circuitry configures the transceiver circuitry further to report, to at least one of the eNBs, an identifier of a BRS of the BRSs that was received with the strongest Tx beam among the BRSs.

* * * * *